(12) United States Patent
Fini et al.

(10) Patent No.: US 9,304,058 B2
(45) Date of Patent: Apr. 5, 2016

(54) MEASURING MODAL CONTENT OF MULTI-MODED FIBERS

(71) Applicant: OFS Fitel, LLC, Norcross, GA (US)

(72) Inventors: John M Fini, Metuchen, NJ (US); Tommy Geisler, Brøndby (DK); Poul Kristensen, Valby (DK); Jeffrey W Nicholson, Warren, NJ (US)

(73) Assignee: OFS FITEL, LLC, Norcross, GA (US)

( * ) Notice: Subject to any disclaimer, the term of this patent is extended or adjusted under 35 U.S.C. 154(b) by 43 days.

(21) Appl. No.: 14/048,848

(22) Filed: Oct. 8, 2013

(65) Prior Publication Data

US 2014/0098361 A1    Apr. 10, 2014

Related U.S. Application Data (60) Provisional application No. 61/711,733, filed on Oct. 9, 2012.

(51) Int. Cl.
*G01M 11/00*    (2006.01)

(52) U.S. Cl.
CPC ............ *G01M 11/331* (2013.01); *G01M 11/33* (2013.01); *G01M 11/333* (2013.01); *G01M 11/335* (2013.01); *G01M 11/338* (2013.01)

(58) Field of Classification Search
None
See application file for complete search history.

(56) References Cited

U.S. PATENT DOCUMENTS

| | | | | |
|---|---|---|---|---|
| 4,411,520 A | * | 10/1983 | Mochizuki et al. | 356/73.1 |
| 4,556,314 A | * | 12/1985 | Stone | 356/73.1 |
| 4,934,819 A | * | 6/1990 | Coppa et al. | 356/73.1 |
| 5,965,874 A | * | 10/1999 | Aso et al. | 250/225 |
| 6,400,450 B1 | * | 6/2002 | Golowich et al. | 356/73.1 |
| 6,633,386 B2 | * | 10/2003 | Walmsley et al. | 356/450 |
| 6,788,397 B1 | * | 9/2004 | Golowich et al. | 356/121 |
| 7,023,556 B2 | * | 4/2006 | Dorrer | 356/477 |
| 7,817,258 B2 | * | 10/2010 | Kristensen et al. | 356/73.1 |
| 8,111,386 B2 | * | 2/2012 | Nicholson et al. | 356/73.1 |
| 8,432,538 B2 | * | 4/2013 | Nicholson et al. | 356/73.1 |
| 8,848,175 B2 | * | 9/2014 | Sengupta | 356/73.1 |
| 8,860,934 B2 | * | 10/2014 | Yablon | 356/73.1 |
| 8,867,028 B2 | * | 10/2014 | Yablon et al. | 356/73.1 |
| 2004/0052522 A1 | * | 3/2004 | Fishteyn et al. | 398/29 |
| 2009/0185171 A1 | * | 7/2009 | Kristensen et al. | 356/73.1 |

* cited by examiner

*Primary Examiner* — Gordon J Stock, Jr.
(74) *Attorney, Agent, or Firm* — Sam S. Han, Esq.

(57) ABSTRACT

Techniques for analyzing output modal content of optical fibers that support more than one spatial mode are disclosed. These techniques are based on spatially resolving interference between co-propagating modes and constructing a spatial beat pattern between the co-propagating modes. By doing so, these techniques provide information about the modes that propagate along the optical fiber.

14 Claims, 7 Drawing Sheets

MEASURING MODAL CONTENT OF MULTI-MODED FIBERS

CROSS-REFERENCE TO RELATED APPLICATIONS

This application claims the benefit of U.S. provisional patent application Ser. No. 61/711,733, filed 2012 Oct. 9, having the title "Improved $S^2$ Imaging Measurement Techniques," which is incorporated herein by reference in its entirety.

This application also incorporates by reference the following, as if expressly set forth in their entireties: (a) U.S. Pat. No. 7,817,258, by Kristensen, et al., issued on 2010 Oct. 19, having the title "Measuring Modal Content of Multi-Moded Fibers"; (b) U.S. Pat. No. 8,111,386, by Nicholson, et al., issued on 2012 Feb. 7, having the title "Measuring Modal Content of Multi-Moded Fibers"; and (c) U.S. Pat. No. 8,432,538, by Nichoson, et al., issued on 2013 Apr. 30, having the title "Measuring Modal Content of Multi-Moded Fibers."

BACKGROUND

1. Field of the Disclosure

The present disclosure relates generally to waveguides and, more particularly, to measuring optical properties of optical waveguides.

2. Description of Related Art

Optical fibers are desirable for their excellent beam quality, even when operating at high power. To the extent that modal content is indicative of beam quality, there are ongoing efforts to improve analysis of modal content of optical fibers that support more than one mode.

SUMMARY

The present disclosure provides techniques for analyzing output modal content of optical fibers that support more than one spatial mode. These techniques are based on spatially resolving interference between co-propagating modes and constructing a spatial beat pattern between the co-propagating modes. By doing so, these techniques provide information about the modes that propagate along the optical fiber.

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION OF THE EMBODIMENTS

Figure 1:
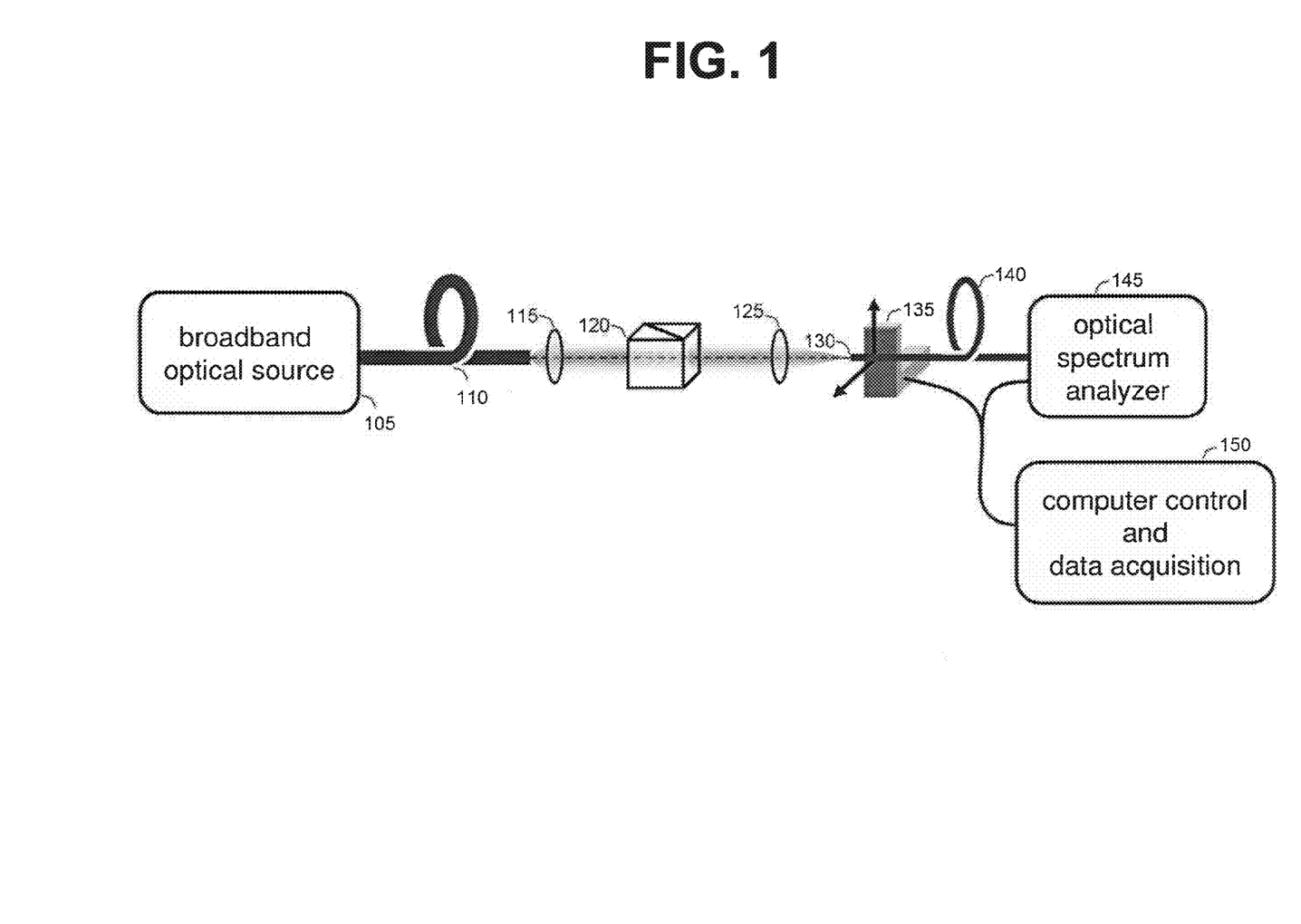
FIG. 1 is a diagram showing one embodiment of a system for performing spatially and spectrally resolved ($S^2$) imaging.

As described in U.S. Pat. No. 7,817,258 (Kristensen), U.S. Pat. No. 8,111,386 (Nicholson), and U.S. Pat. No. 8,432,538 (Nicholson), spatially-and-spectrally-resolved ($S^2$) imaging is a recently-developed technique for measuring mode content in a fiber that supports multiple modes. The original measurement setup, which is shown in FIG. 1, permitted testing of a fiber-under-test (FUT) 110 by launching a broadband optical source 105 into the FUT 110. The output of the FUT 110 is propagated through lenses 115, 125 and a polarizer 120 (optionally interposed between lenses 115, 125), with the resulting image being projected to an imaging plane 130, which is perpendicular to a direction of beam propagation. The resulting image is scanned at an input 135 of a single-mode fiber (SMF) 140. It is to be noted that the single mode fiber operates as a spatial filter. While the SMF is convenient, other types of spatial filters, such as pinholes, could also be utilized. The obtained spectrum is measured and processed for each spatial point using an optical spectrum analyzer (OSA) 145 and a computer control and data acquisition unit 150. The system of FIG. 1 produces a three-dimensional (3D) data set of spectrum as a function of spatial position, thereby providing useful information on a variety of fibers, such as, for example, large-mode-area (LMA) fibers for high-power lasers, hollow-core fibers, and few-moded fibers for spatial division multiplexed transmission.

Although the $S^2$ system of FIG. 1 provides useful information, there are a variety of modifications that can be implemented to extend the capabilities of the $S^2$ system. Several embodiments of systems that extend the capabilities of $S^2$ imaging are described below with reference to FIGS. 2 through 6. While these embodiments are described in connection with FIGS. 2 through 6, there is no intent to limit the disclosure to the embodiment or embodiments disclosed herein. On the contrary, the intent is to cover all alternatives, modifications, and equivalents.

Figure 2:
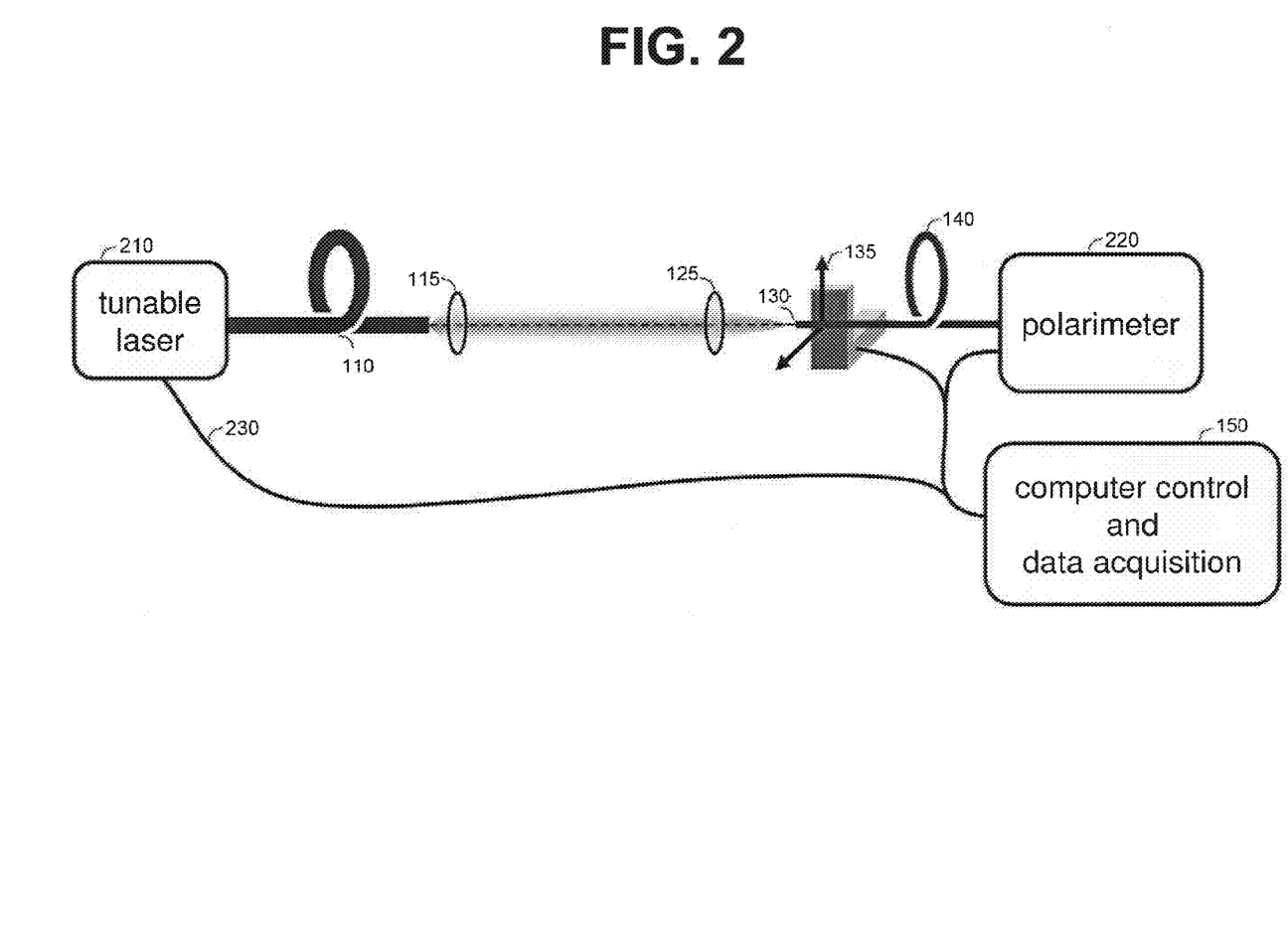
FIG. 2 is a diagram showing one embodiment of a system for measuring spatial dependence of polarization states.

With this in mind, attention is turned to FIG. 2, which is a diagram showing one embodiment of a system for measuring spatial dependence of polarization states. As shown in FIG. 2, this embodiment of the system comprises a tunable laser 210 to launch a signal into a FUT 110. Those skilled in the art will understand that the tunable laser 210 can be substituted with a broadband source that is operatively coupled to a tunable filter. The launched light propagates through the FUT 110 and a magnification stage (comprising lenses 115, 125). The resulting image is projected to an imaging plane 130 (again, perpendicular to a direction of beam propagation) and scanned at an input 135 of a SMF 140. The SMF serves the function of a spatial filter. Other types of spatial filters, such as a pinhole, could be advantageously utilized. The embodiment of FIG. 2 further comprises a polarimeter 220, which measures the polarization state at each spatial point. The resulting data is analyzed using the computer control and acquisition unit 150.

At each spatial position the computer control and acquisition unit 150 provides a feedback signal 230 that directs the tunable laser 210 to sweep through its wavelength range and, thus, the computer control and acquisition unit 150 obtains the polarization state of the output of the FUT 110 as a function of wavelength and the spatial position.

By obtaining polarization data, the embodiment of FIG. 2 permits spatial resolution of wavelength dependence of the Stokes vector on the Bloch sphere. Thus, where different modes and different polarizations have different group delays, the embodiment of FIG. 2 allows consideration of the polarization states of each mode and resolves the beats between the different polarization states.

The $S^2$ imaging technique can also be extended to perform spatially-resolved temporal measurements. These spatially-resolved temporal measurements permit measurement of differential group delays of different modes. Specifically, differential group delays manifest themselves differently for different sources. For example, for broadband, continuous wave sources, differential group delays appear as spectral interference patterns. On the other hand, for pulsed sources, the presence of multiple modes results in a single pulse being split into multiple pulses, one for each mode present. The temporal delay between the pulses depends on the modal group delay, and the relative intensity of the pulse depends on the spatial position of the measurement, as shown in FIG. 6. Thus, for example, the relative intensities of three different modes (labeled "mode-1," "mode-2," and mode-3" in FIG. 6) will largely be a function of the spatial location at which the modal intensities are measured. Consequently, the measurement of relative intensity for a particular group delay provides a measurement of relative power. Additionally, since the pulse width spreads as a function of fiber dispersion, the spatially-resolved temporal measurements also provide a way to measure the magnitude of dispersion for each mode. With this in mind, attention is turned to FIGS. 3 through 5, which provide several embodiments of systems that perform spatially-resolved temporal measurements. Specifically, FIG. 3 shows one embodiment of a system for time-of-flight measurements, while FIGS. 4 and 5 show embodiments of systems for measuring spatially-resolved autocorrelations.

Figure 3:
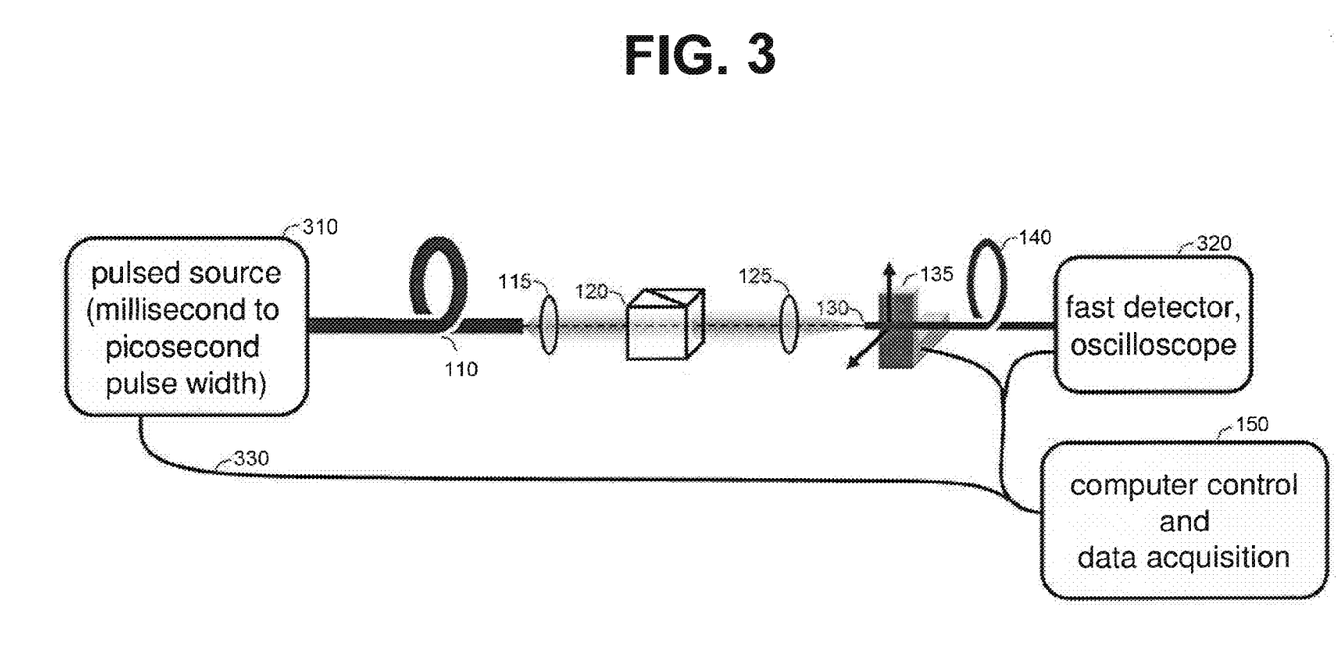
FIG. 3 is a diagram showing one embodiment of a system for measuring differential group delays of modes, as well as the magnitude of the dispersion of each mode.

As shown in FIG. 3, one embodiment of a system for time-of-flight measurements comprises a pulsed source 310 for relatively long pulses (e.g., pulse widths on the order of picoseconds to milliseconds). The pulsed source 310 launches, for example, a pulse of approximately one (1) to ten (10) picoseconds into the FUT 110. The resulting image is propagated through a magnification stage (115, 120, 125). The resulting image, which is projected to an imaging plane 130, is scanned at an input 135 of SMF 140. The embodiment of FIG. 3 comprises a temporally-resolved detection system 320, such as a fast detector (or photodiode) operatively coupled to an oscilloscope. Optionally, if desired, a synchronization signal can be provided from the pulse source to the computer control and data acquisition system via the connection 330 in order to synchronize the fast detector. This type of synchronization is important in, for example, low repetition frequency measurements. Alternatively, the computer control and acquisition unit 150 could provide a trigger signal via the connection 330 to pulsed source 310. Since differential group delays are typically in the range of several-to-tens of picoseconds per meter (ps/m), the detection system 320 can measure delay times on the order of nanoseconds (ns). Thus, the embodiment of FIG. 3 permits lengths from a few meters to several kilometers for the FUT 110.

Figure 4A:
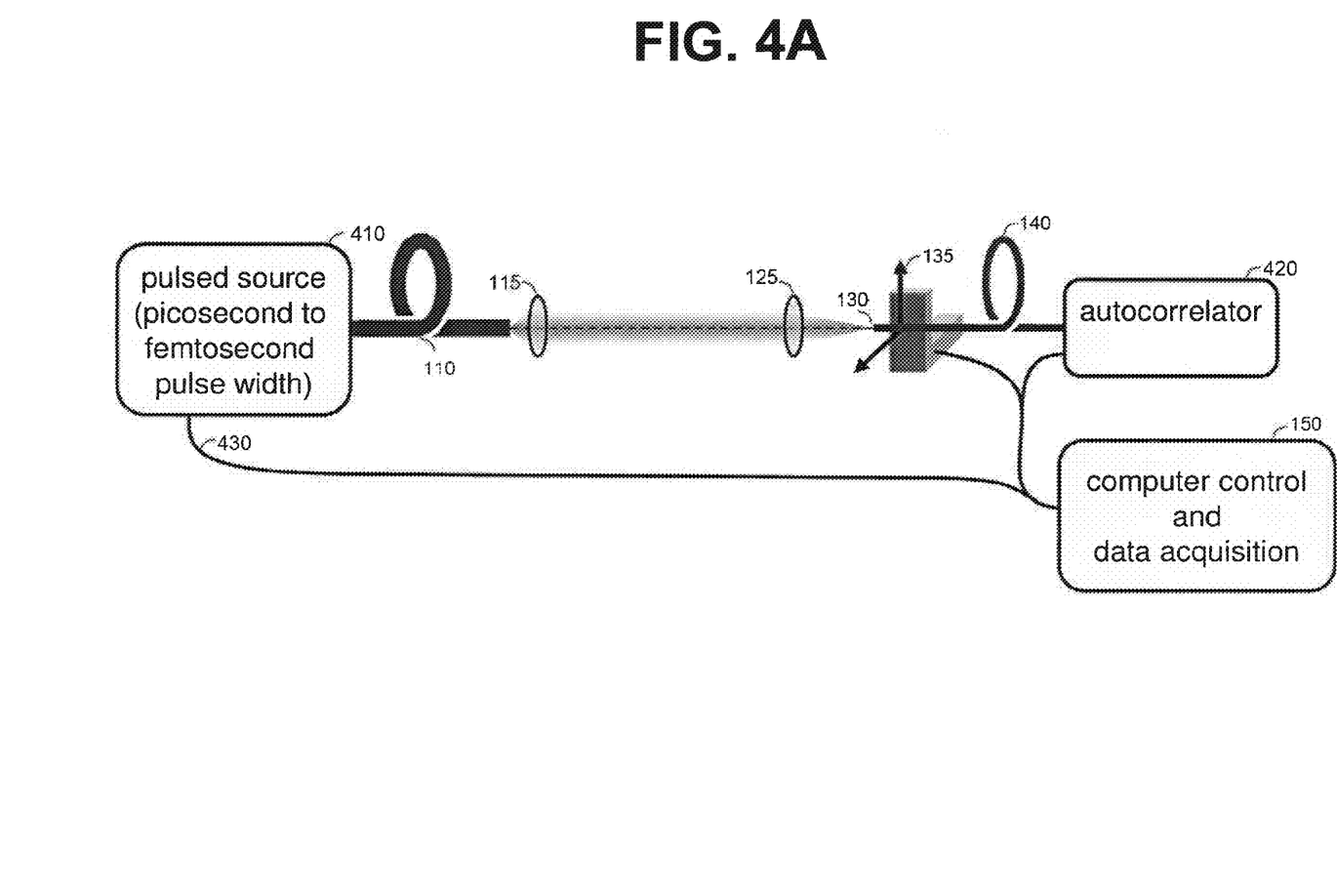
FIG. 4A is a diagram showing another embodiment of a system for measuring differential group delays of modes, as well as the magnitude of the dispersion of each mode.
Figure 4B:
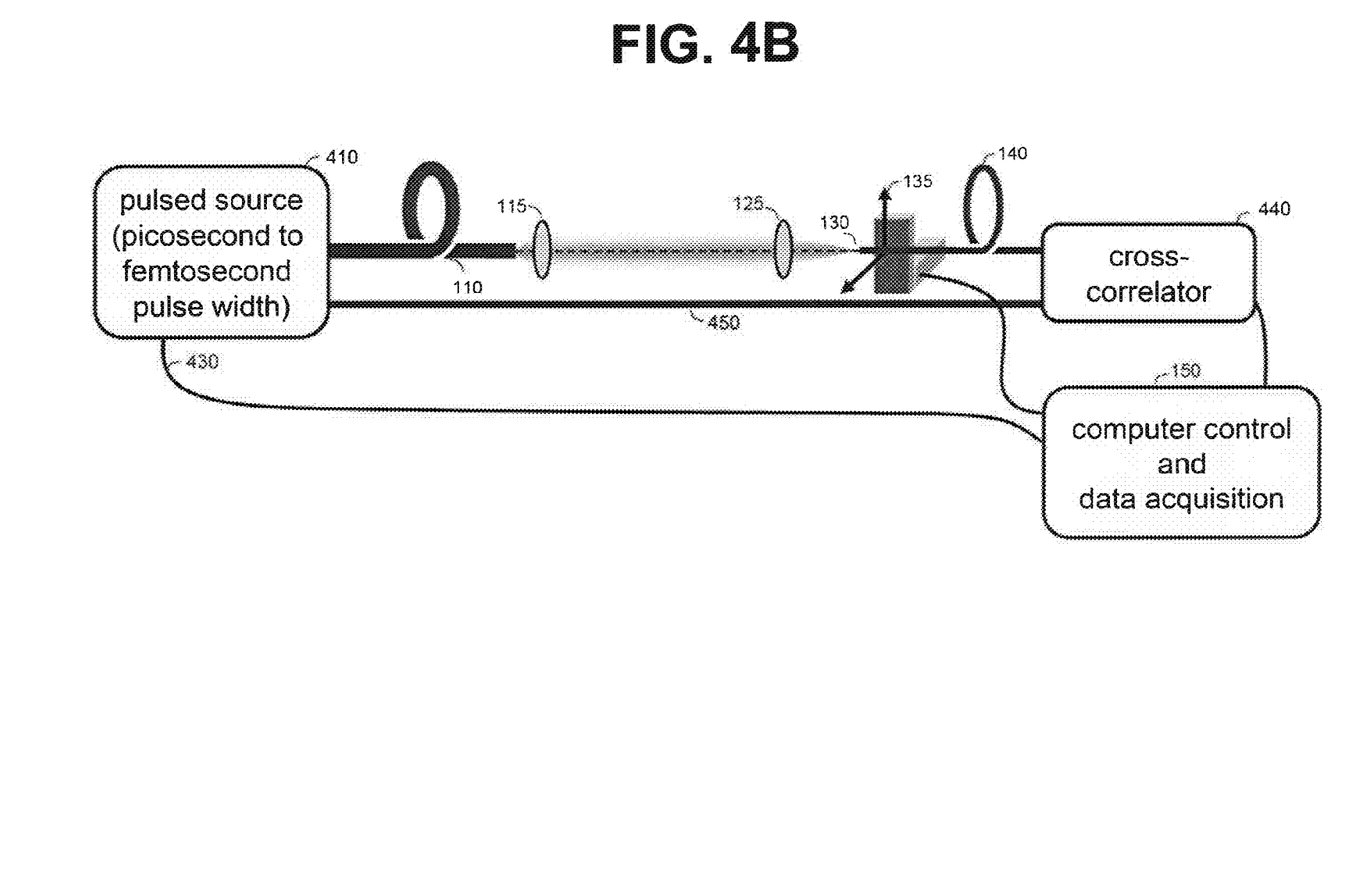
FIG. 4B is a diagram showing yet another embodiment of a system for measuring differential group delays of modes, as well as the magnitude of the dispersion of each mode.
Figure 5:
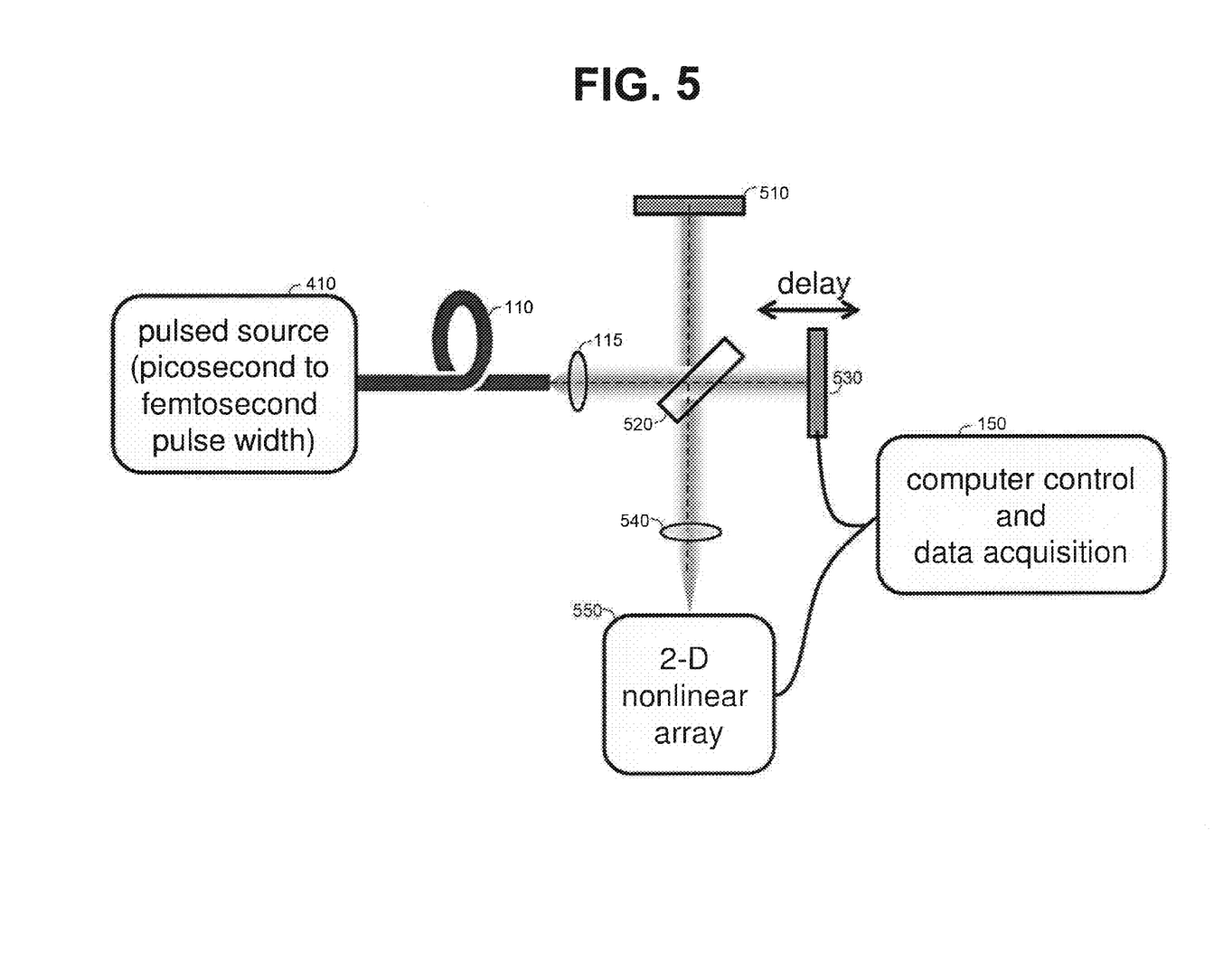
FIG. 5 is a diagram showing another embodiment of a system for measuring differential group delays of modes, as well as the magnitude of the dispersion of each mode.
Figure 6:
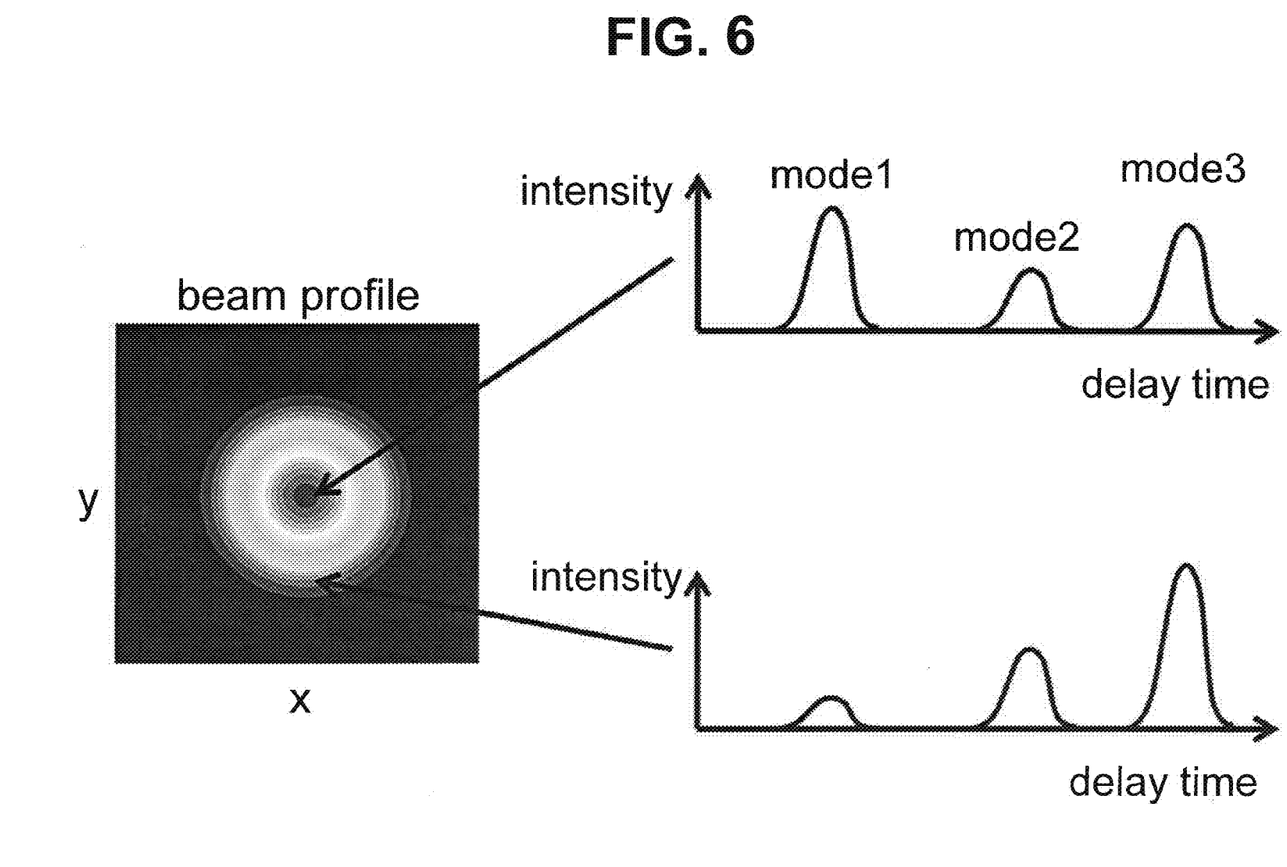
FIG. 6 is a graphical illustration showing one embodiment of variations in pulse intensity as a function of delay and spatial position.

While FIG. 3 shows an embodiment of a system for measuring relatively long pulses (e.g., on the order of picoseconds to milliseconds), FIGS. 4 and 5 show embodiments of systems for measuring relatively short pulses (e.g., on the order of femtoseconds to picoseconds). This is because, when pulse widths are on the order of picoseconds (or shorter), it may be necessary to employ nonlinear techniques, such as second-order nonlinear autocorrelations or more advanced techniques, such as frequency-resolved optical grating (FROG) or spectral interferometer for direct electric-field reconstruction (SPIDER). By spatially resolving autocorrelations, it is possible to obtain similar information as that obtained using the system of FIG. 3. In other words, spatially-resolved autocorrelations provide information on modal group delays for short pulse sources.

With this in mind, FIG. 4A shows a system for measuring differential group delays, which comprises a pulsed source 410 that launches relatively short pulses (e.g., on the order of femtoseconds to picoseconds) into a FUT 110. Similar to the embodiment of FIG. 2, the launched light propagates through the FUT 110 and a magnification stage (comprising lenses 115, 125). The resulting image is projected to an imaging plane 130 (once again, perpendicular to a direction of beam propagation) and scanned at an input 135 of a SMF 140. The embodiment of FIG. 4 further comprises an autocorrelator 420 and a computer control and acquisition unit 150, which are placed at the output of the SMF 140. Optionally, a synchronization signal, 430, from the pulsed source can be provided to the computer control and data acquisition unit 150, or the computer can provide a trigger to control the generation of a pulsed source 410. In another embodiment, as shown in FIG. 4B, rather than using an autocorrelator, the output beam profile can be cross-correlated with the launched pulses 450.

As an alternative to the embodiment of FIGS. 4A and 4B, the autocorrelation can be performed with an interferometer placed at the output of the FUT 110 and detecting the nonlinear signal from a nonlinear crystal or two-dimensional (2D) nonlinear two-photon detector, which is shown in the embodiment of FIG. 5. As shown in FIG. 5, this embodiment of the system comprises a pulsed source 410 (for relatively short pulses), which launches a short pulse into the FUT 110. After propagating through the FUT 110, the resulting light passes through a lens 115, and is then split by a beam splitter 520. Part of the beam is directed to one reflector 510 (first reflector), while the remainder of the beam is directed to another reflector 530 (second reflector). The first reflector 510 remains stationary with reference to the FUT 110, while the second reflector 530 is movable along the path of the beam. The location of the second reflector 530 is controlled by the computer control and data acquisition unit 150. Movement of the second reflector 530 along the beam path effectively creates a delay. The reflected beam is directed through another lens 125 by the beam splitter 520, and the resulting image is detected at a 2D nonlinear array 550. For some embodiments, the 2D nonlinear array 550 comprises silicon photodiodes, which work as two-photon detectors when pulsed at a wavelength of 1550 nanometers. The silicon photodiode array can be implemented by a charge-coupled device (CCD) array. As one can appreciate, the interferometer (which comprises the image magnification and reflector components) at the output of the FUT 110 permits 2D autocorrelations, which provides information on nonlinear pulses. The autocorrelations, which are obtainable from the systems of FIGS. 4A and 5, permit spatial resolution of group delays, relative intensities, and pulse widths for each of the modes present in the FUT 110 for relatively short pulses.

Once the data is obtained, the data set can be analyzed using a variety of computer algorithms. For the original $S^2$ measurement, Fourier transform data analysis provided the extraction of higher-order mode images, relative power levels, and group delays. In the case of the measurement of the wavelength and spatial dependence of polarization state described here, Fourier transform analysis of the power and of the three Stokes vector components enables calculation of the spatial mode birefringence as well as the polarization mode birefringence. Examples of this type of data analysis are shown by T. Geisler, M. E. Pedersen, and S. Herstrøm, "Measurement of Spatial and Polarization Birefringence in Two-Mode Elliptical Core Fibers," in Optical Fiber Communication Conference/National Fiber Optic Engineers Conference 2013, OSA Technical Digest (online) (Optical Society of America, 2013), paper OW1K.3.), which was disclosed in U.S. provisional patent application Ser. No. 61/711,733, filed 2012 Oct. 9, having the title "Improved $S^2$ Imaging Measurement Techniques."

As shown from the embodiments of FIGS. 2 through 5, a variety of modifications can be implemented to extend the capabilities of the $S^2$ system of FIG. 1. These modifications permit spatial measurements of polarization states (FIG. 2) and spatially resolved temporal measurements for relatively long pulses (FIG. 3) as well as for relatively short pulses (FIGS. 4A, 4B, and 5). Consequently, these systems (FIGS. 2 through 5) provide approaches for obtaining additional valuable information, which was previously unobtainable using the $S^2$ imaging system of FIG. 1.

The computer control and acquisition unit 150 may be implemented in hardware, software, firmware, or a combination thereof. In the preferred embodiment(s), the computer control and acquisition unit 150 is implemented in software or firmware that is stored in a memory and that is executed by a suitable instruction execution system. If implemented in hardware, as in an alternative embodiment, the computer control and acquisition unit 150 can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Any process descriptions should be understood as representing modules, segments, or portions of code which include one or more executable instructions for implementing specific logical functions or steps in the process, and alternative implementations are included within the scope of the preferred embodiment of the present disclosure in which functions may be executed out of order from that shown or discussed, including substantially concurrently or in reverse order, depending on the functionality involved, as would be understood by those reasonably skilled in the art of the present disclosure.

Any disclosed executable program, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any sysc that can contain, store, communicate, propagate, or transport the program for use by or in connection with the instruction execution system, apparatus, or device. The computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured via, for instance, optical scanning of the paper or other medium, then compiled, interpreted or otherwise processed in a suitable manner if necessary, and then stored in a computer memory.

Although exemplary embodiments have been shown and described, it will be clear to those of ordinary skill in the art that a number of changes, modifications, or alterations to the disclosure as described may be made. For example, it should be appreciated that the various disclosed embodiments can be used in combination with each other to obtain additional information from the launched signals. These, and all other such changes, modifications, and alterations should therefore be seen as within the scope of the disclosure.

What is claimed is:

1. A system, comprising:
a source that launches an optical pulse;
an optical waveguide that receives the optical pulse, the optical waveguide that further propagates the optical pulse, the optical waveguide supporting the propagation of different modes, the optical pulse being split into multiple pulses as it propagates along the optical waveguide, the optical waveguide that further produces an output beam, the output beam having a beam profile, the beam profile exhibiting the different modes;
a lens that images the output beam;
an optical spatial filter that selects a portion of the output beam;
an apparatus for scanning the optical spatial filter in an imaging plane, the imaging plane being approximately normal to the output beam propagation direction; and
a temporally-resolved detector that detects a temporal delay between the multiple pulses, the temporally resolved detector being a cross-correlator for cross-correlating the launched optical pulse with the output beam.

2. The system of claim 1, the optical spatial filter being a single-mode fiber.

3. The system of claim 1, the temporally-resolved detector comprising:
a photodiode; and
an oscilloscope operatively coupled to the photodiode.

4. The system of claim 1, the temporal delay being dependent on a modal group delay.

5. The system of claim 1, the temporally-resolved detector that further detects differential group delays of the multiple modes.

6. The system of claim 1, the temporally-resolved detector that further detects a corresponding pulse intensity for each of the multiple pulses.

7. The system of claim 1, the temporally-resolved detector that further detects a corresponding pulse width for each of the multiple pulses.

8. The system of claim 6, each of the pulse intensities being dependent on a corresponding spatial position.

9. The system of claim 7, each of the corresponding pulse widths being dependent on dispersion characteristics of the optical waveguide.

10. The system of claim 9, the temporally-resolved detector that further detects a magnitude of dispersion for each of the multiple modes.

11. A system, comprising:
- a computer control and data acquisition unit that triggers a pulsed light;
- a source that launches the pulsed light, the pulsed light having a width that is less than a picosecond, the pulsed light having multiple modes;
- an optical waveguide that receives the pulsed light and propagates the pulsed light, the pulsed light being split into multiple pulses as it propagates along the optical waveguide, the multiple pulses having corresponding pulse widths, the optical waveguide that outputs the multiple pulses; and
- a two-dimensional nonlinear pulse characterizer that measures the pulse widths of the multiple pulses as a function of spatial position, the nonlinear pulse characterizer being an interferometer operatively coupled with a two-dimensional nonlinear array.

12. The system of claim 11, the two-dimensional nonlinear array comprising a charge-coupled device (CCD) array.

13. A system, comprising:
- a computer control and data acquisition unit that triggers a pulsed light;
- a source that launches the pulsed light, the pulsed light having a width that is less than a picosecond, the pulsed light having multiple modes;
- an optical waveguide that receives the pulsed light and propagates the pulsed light, the pulsed light being split into multiple pulses as it propagates along the optical waveguide, the multiple pulses having corresponding pulse widths, the optical waveguide that outputs the multiple pulses; and
- a two-dimensional nonlinear pulse characterizer that measures the pulse widths of the multiple pulses as a function of spatial position, the nonlinear pulse characterizer being an autocorrelator to correlate the launched pulsed light with the multiple pulses.

14. A system, comprising:
- a computer control and data acquisition unit that triggers a pulsed light;
- a source that launches the pulsed light, the pulsed light having a width that is less than a picosecond, the pulsed light having multiple modes;
- an optical waveguide that receives the pulsed light and propagates the pulsed light, the pulsed light being split into multiple pulses as it propagates along the optical waveguide, the multiple pulses having corresponding pulse widths, the optical waveguide that outputs the multiple pulses; and
- a two-dimensional nonlinear pulse characterizer that measures the pulse widths of the multiple pulses as a function of spatial position, the nonlinear pulse characterizer further to cross-correlate the launched pulsed light with the multiple pulses.

\* \* \* \* \*